(12) United States Patent
Glejbøl et al.

(10) Patent No.: US 12,286,955 B2
(45) Date of Patent: Apr. 29, 2025

(54) WAVE POWER SYSTEM

(71) Applicant: Wavepiston A/S, Helsingør (DK)

(72) Inventors: Kristian Glejbøl, Helsingør (DK); Martin Von Bülow, Helsingør (DK)

(73) Assignee: WAVEPISTON A/S, Helsingør (DK)

( * ) Notice: Subject to any disclaimer, the term of this patent is extended or adjusted under 35 U.S.C. 154(b) by 0 days.

(21) Appl. No.: 18/699,148

(22) PCT Filed: Oct. 7, 2022

(86) PCT No.: PCT/DK2022/050207
§ 371 (c)(1),
(2) Date: Sep. 6, 2024

(87) PCT Pub. No.: WO2023/057028
PCT Pub. Date: Apr. 13, 2023

(65) Prior Publication Data
US 2024/0401556 A1    Dec. 5, 2024

(30) Foreign Application Priority Data
Oct. 7, 2021   (DK) .............................. PA202100959

(51) Int. Cl.
*F03B 13/18*   (2006.01)
(52) U.S. Cl.
CPC .................................. *F03B 13/18* (2013.01)
(58) Field of Classification Search
CPC .... F03B 13/18; F03B 13/187; F05B 2240/40; F05B 2250/311; F05B 2260/406; Y02E 10/30
See application file for complete search history.

(56) References Cited

U.S. PATENT DOCUMENTS

| | | | | |
|---|---|---|---|---|
| 4,371,788 A | * | 2/1983 | Smith, Jr. | ............. F03B 13/185 60/507 |
| 10,006,434 B1 | | 6/2018 | Peed | |

(Continued)

FOREIGN PATENT DOCUMENTS

| | | |
|---|---|---|
| DE | 102012021899 A1 | 5/2014 |
| DK | 201000570 A | 7/2010 |

(Continued)

OTHER PUBLICATIONS

International Preliminary Report on Patentability received for PCT Patent Application No. PCT/DK2022/050207, mailed on Apr. 18, 2024, 7 pages.

(Continued)

*Primary Examiner* — Woody A Lee, Jr.
*Assistant Examiner* — Eric A Lange
(74) *Attorney, Agent, or Firm* — Boone IP Law

(57) ABSTRACT

A wave power system for extracting energy from water waves, The wave power system includes a basic structure comprising at least one straight track section; at least one effector movably engaged with said basic structurer and adapted for being moved by water waves along said straight track section in a travelling length between two stop locations; and an energy harvesting arrangement arranged for harvesting energy from said relative movements between said energy collector and said basic structurer. The effector includes a backbone structure comprising at least one support shaft having a support shaft axis. At least one winglet comprising a compliant portion is rooted to the support shaft and is turnable between operation modes comprising an acceleration mode an intermediate mode and a deceleration mode relative to the support shaft axis.

19 Claims, 10 Drawing Sheets

(56) References Cited

U.S. PATENT DOCUMENTS

2007/0257491 A1    11/2007   Kornbluh et al.
2011/0204643 A1    8/2011    Von Bulow et al.
2016/0083920 A1    3/2016    Siltala et al.
2020/0088155 A1*  3/2020    Von Bülow ............ F03B 13/18

FOREIGN PATENT DOCUMENTS

| DK | 201000570 L | * | 7/2010 | ............. F03B 13/14 |
| --- | --- | --- | --- | --- |
| WO | 81/00285 A1 | | 2/1981 | |
| WO | 2017/042651 A1 | | 3/2017 | |
| WO | 2020/257909 A1 | | 12/2020 | |
| WO | 2022/214153 A1 | | 10/2022 | |

OTHER PUBLICATIONS

International Search Report and Written Opinion received for PCT Patent Application No. PCT/DK2022/050207, mailed on Nov. 18, 2022, 11 pages.
Office Action received for Denmark Patent Application No. PA202100959, mailed on Mar. 1, 2022, 6 pages.

* cited by examiner

WAVE POWER SYSTEM

TECHNICAL FIELD

The invention relates to a wave power system for extracting energy from water waves, such as surface water waves e.g. in waters such as oceans, lakes or any other waters where water surface waves are generated by wind or other environmental influences.

BACKGROUND ART

For many years, there has been high focus on environment friendly methods for generating energy, in particular by extracting energy from sun, wind and water waves.

Many different systems for extracting energy from water waves have been suggested. US 2007/0257491 discloses a wave power system comprising a plurality of generators comprising a float and a brake and a mechanical energy transmission system that harnesses wave energy and converts it into limited motion that is suitable for input to an electrical energy generator.

WO20257909 describes a wave energy harnessing system comprising a plurality of wave energy devices coupled together, to form a high capacity installation. The wave energy device includes a buoyant body, which maintains a permanent orientation relative to the surface of the ocean, while the power take-off (PTO) would self-align in the direction of the incoming waves. The power take-off is completely enclosed, above the waterline and easily accessible. The buoyant body is coupled to the buoyant bodies of other similar wave energy devices by flexible or articulating coupling means. The wave energy devices are arranged in arrays or any other suitable layouts, to form large connected floating structures.

US2020088155 discloses a wave power device for extracting energy from water waves. The wave power device comprise a reference structure and effectors moving relative to the reference structure. Each effector is connected to two hydraulic rams, symmetrically positioned around each effector. The hydraulic rams have an effective hydraulic area which is stepwise increased as the length of the hydraulic rams are compressed and stepwise decreased as the length of the hydraulic rams are increased.

A particular challenge for such wave power systems is that they are subjected to harsh environment in the water e.g. ocean water, both in respect of chemical and mechanical influences on the system. Violent storms are frequent, and aerated seawater is highly corrosive. Cost of installation may also be a challenge.

DISCLOSURE OF INVENTION

An objective of the present invention is to provide a wave power system, which is relatively robust and simultaneously effective for harvesting wave energy.

In an embodiment, it is an objective to provide a wave power system, comprising effector(s) with a relatively high effectivity and still having a desired high resistivity against being damaged by even violent waves.

In an embodiment, it is an objective to provide a wave power system, comprising effector(s) with a relatively high surface area for being moved effectively by the water waves wherein the effector(s) at the same time is relatively robust and durable.

These and other objects have been solved by the inventions or embodiments thereof as defined in the claims and as described herein below.

It has been found that the inventions or embodiments thereof have a number of additional advantages, which will be clear to the skilled person from the following description and claims.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Reference made to "some embodiments" or "an embodiment" means that a particular feature(s), structure(s), or characteristic(s) described in connection with such embodiment(s) is included in at least one embodiment of the subject matter disclosed. Thus, the appearance of the phrases "in some embodiments" or "in an embodiment" in various places throughout the specification is not necessarily referring to the same embodiment(s). Further, the skilled person will understand that particular features, structures, or characteristics may be combined in any suitable manner within the scope of the invention as defined by the claims.

The term "substantially" should unless otherwise specified or clear from the context, be taken to mean that ordinary product variances and tolerances are comprised.

Throughout the description or claims, the singular encompasses the plural unless otherwise specified or required by the context.

All features of the invention and embodiments of the invention as described herein, including ranges and preferred ranges, may be combined in various ways within the scope of the invention, unless there are specific reasons not to combine such features.

The wave power system of the invention provides a desirable robust system for extracting energy from water waves, which system may be installed in a relatively simple manner, as it will be explained further herein.

The wave power system comprises
- a basic structure comprising at least one straight track section,
- at least one effector movably engaged with the basic structure and adapted for being moved relative to the basic structure by water waves, and
- an energy harvesting arrangement arranged for harvesting energy from the relative movements between the energy collector and the basic structure.

The basic structure may in an embodiment be referred to as a substantially stationary member. The term "substantially stationary member" means that the member in use is mounted to remain substantially stationary when the effector(s) moves relatively thereto.

The term "straight track section" means that the track section is essentially uncurved. However, the straight track section may be slightly curved, such as with a curving radius of 25 meters or more, such as a curving radius of 50 meters or more, such as a curving radius of 100 meters or more. Where an angle is given in respect of the straight trach section, it is determined when the effector is located at the middle point of the straight track section and relative to the tangent to the straight track section at that middle location. Advantageously, the straight track section is entirely straight The inventor of the present invention has found that by providing the effector with at least one effector section, in the form of a winglet having a desired compliance as described further herein, a highly improved wave power system may be obtained.

The at least one effector of the wave power system comprises
  a backbone structure comprising at least one support shaft having a support shaft axis, and
  at least one winglet
wherein the winglet is rooted to and protrudes from the support shaft.

The winglet has a compliant portion, which is more compliant than the support shaft to which it is rooted.

The inventor has found that providing an effective wave collecting area by the winglet with at least a compliant portion the resistance against the effector being damaged by the waves may be highly increased and in addition it has been found that this compliant portion of the winglet provides that the winglet may have several operation modes as described further herein.

The winglet has a root where it is rooted to the support shaft. Conveniently, the winglet comprises a remote edge farthest from the root and a length perpendicular to the support shaft and extending between the root and the remote edge. The winglet further has two opposite winglet faces, which are the faces adapted for being impelled by water waves as the water waves such as, particles of the water waves are thrusting towards the respective winglet faces.

The winglet is turnable between operation modes comprising an acceleration mode an intermediate mode and a deceleration mode relative to the support shaft axis.

In the acceleration mode, at least one of the faces of the winglet is preferably substantially perpendicular to the straight track section, and a relatively high force from water waves is transmitted to the backbone structure of the effector via the winglet.

Whenever the system transit from acceleration mode to the intermediate mode, the force exhibited by the winglets on the backbone structure are gradually decreased, preferably approaching zero when the winglet reaches the deceleration mode.

The length of the winglet is determined as the longest length, i.e. the longest distance between the root and the remote edge determined perpendicular to the support shaft.

The remote edge may in principle have any contour however it has been found that some contours are more beneficial. In an embodiment, the remote edge contour comprises a straight edge. This contour is relatively simple to provide, which may reduce cost.

In an embodiment, the remote edge contour comprises a convex edge a wave-shaped edge and/or a tip-shaped edge. Each of these remote edge contours has shown to be beneficial in optimization of the robustness of the winglet when subjected to switching between the respective operation modes.

The compliant portion preferably comprises at least a compliant section, such as a compliant length section of the winglet. In an embodiment, the compliant length portion has a length perpendicular to the support shaft which is at least 50% of the length on the winglet, such as at least 60% of the length of the winglet, such as at least 60% of the length of the winglet, such as at least 70% of the length of the winglet, such as at least 80% of the length of the winglet, such as at least 90% of the length of the winglet, such as the entire winglet.

The compliance may be equal over the compliant length section. In an embodiment, the compliance of the compliant portion is increasing in dependence of the distance from the root of the winglet.

In an embodiment, the compliant portion comprises a tip section of the winglet, wherein the tip section is a section furthest from the root of the winglet i.e. immediately adjacent to the remote edge.

By providing the compliant portion to include the tip section, it has been found that the winglet becomes highly resistant towards damage for being tunable and thereby rotated between operation modes.

Without being bound by the theory, it is believed that when the effector is moved with high speed towards an end stop, an amount of water is moving together with the effector and add a virtual mass to the effector—this virtual mass is also called "added mass". It is believed that the effector thereby is surrounded by force applied by the virtual mass. It was found that attempt to provide prior art effectors to operate in different modes by changing orientation of the collecting faces of the effector, resulted in that the effector was subjected to damaging twisting forces which in addition made it difficult the control the switching between operation modes.

By providing the effector with winglet(s) comprising the compliant portion this problem has now been alleviated.

Advantageously, the compliant section of the winglet has a compliance providing that when the winglet is fully submerged in still standard sea water at 10° C. and rotated 90° about the support shaft with 0.5 sec, at least one of the faces of a tip section of the winglet immediately adjacent to the remote edge of the winglet will be angular displaced with at least 10° relative to the at least one face in unloaded condition. Preferably, at least one of the faces of the tip section of the winglet immediately adjacent to the remote edge of the winglet will be angular displaced with at least 15°, such as between 20° and 80°, such as between 25° and 60° relative to the at least one face of the tip section in unloaded condition.

The compliance is advantageously determined with the support shaft in vertical orientation and the winglet 5 cm below the water surface. For example, the compliant section of the winglet may have a length of 1 m and it may be submerged to reach a depth of 105 cm or more.

In an embodiment, the tip section is a length section along the length of the winglet. Advantageously, the tip section has a length of at least 1 cm, such as at least 5 cm, such as at least 10 cm.

Standard Seawater is Artificial Seawater According to ASTM D1141-98 (2021)

Advantageously, the compliant section of the winglet has a compliance providing that at least one of the faces of the tip section of the winglet immediately adjacent to the remote edge of the winglet is angular displaceable with at least 10° relative to the at least one face in unloaded condition without resulting in irreversible plastic deformation, preferably the least one of the faces of a tip section of the winglet immediately adjacent to the remote edge of the winglet is angular displaceable with at least 15°, such as at least 15°, such as between 20° and 80°, such as between 25° and 60° relative to the at least one face in unloaded condition without resulting in irreversible plastic deformation The compliance may e.g. be determined by applying a force to the face immediately adjacent to one of the faces of the winglet immediately adjacent to the remote edge and/or at the tip section.

In an embodiment, the displacement may result in a plastic deformation, but where the plastic deformation is reversible and may be restored by applying a force in opposite direction.

In an embodiment, the displacement does not result in a plastic deformation.

It should be noted that minor changes in the material of the winglet, which does not change the overall structure, and/or mechanical performance of the winglet is preferably not considered to be irreversible deformations.

In an embodiment, the compliant section of the winglet has a compliance providing that when a force in the interval of from 25 N to 1 kN is applied to one of the faces of the tip section of the winglet, preferably immediately adjacent to the remote edge of the winglet, this at least one face of the tip section will be angular displaced with at least 10° relative to the face in unloaded condition without resulting in irreversible plastic deformation, preferably this at least one face of the tip section will be angular displaced with at least 15°, such as between 20° and 80°, such as between 25° and 60° relative to the face in unloaded condition without resulting in irreversible plastic deformation.

Preferably, the force applied is 25N-1000N.

The winglet may in principle be provided in any material or combination of materials, which material or materials is/are suitable for use in seawater and has a relatively high strength Advantageously, the winglet is made entirely from one material or material composition.

Preferred materials for the winglet comprises one or more of metals, such as steel and aluminum; polymer materials, such as polypropylene (PP), polyethylene (PE), polyoxymethylene (POM), polyurethane (PU), polyamide (PA), polyethylene terephthalate (PET), and/or composite materials, such as fiber reinforced polymer, preferably glass fiber reinforced polymer (GFRP), basalt fiber reinforced polymer (BFRP), metal fiber reinforced polymer (MFRO), carbon fiber reinforced polymer (CFRP), and/or combinations thereof. Where the winglet comprises a fiber reinforced polymer, it may be advantageous to provide a fiber orientation where a larger amount of the fibers is oriented along the length of the winglet than along the width of the winglet. Thereby a desired compliance of the winglet may be obtained.

In an embodiment, at least the compliant portion of the winglet comprises a composite material comprising a polymer material with embedded fibers. Advantageously, at least the compliant portion of the winglet consists of composite materials comprising one or more polymers and embedded fibers e.g. as the fibers described above. Preferred fibers comprises one or more of synthetic fiber, semi-synthetic fiber, regenerated fiber, plant fiber, carbon fiber, animal fiber and/or metal fiber or any combination comprising one or more of these.

The synthetic fiber may comprise at least one of nylon, polyester, acrylic, polyvinyl chloride, polyurethane, vinylon, or aramid fiber. The semi-synthetic fiber may comprise at least one of acetate, triacetate, or promix fiber. The regenerated fiber may comprise at least one of rayon, cupro, or polynosic fiber. The plant fiber may comprise at least one of cotton or hemp fiber. The carbon fiber comprises at least one of pure carbon or pitch carbon. The animal fiber comprises at least one of hair, angora, spider silk, or mohair fiber. The metal fiber comprises at least one of silver or steel fiber.

The polymer may advantageously be selected from natural rubber, polypropylene (PP), polyethylene (PE), polyoxymethylene (POM), polyurethane (PU), polyamide (PA), polyethylene terephthalate (PET) and/or resin. Examples of resin includes epoxy resin, such as polymer modified epoxy, e.g. PU modified epoxy. By using an elastomer modified epoxy resin, the winglet may be provided with highly advantageous properties in respect of flexibility, strength and durability.

The winglet may advantageously be rigidly rooted to the support shaft and the support shaft is turnable for turning the winglet. Thereby a beneficial control of the operation modes may be obtained.

Advantageously, the support shaft is turnable from a first angle position, over an intermediate angle range and to a second angle position. The first angle position and the second angle position are advantageously perpendicular to each other or has an angle of up to 30° from perpendicular in both directions (±30°) i.e. 60°-120°. In an embodiment, the first angle position and the second angle position are advantageously perpendicular to each other or has an angle of up to 20° from perpendicular, such as up to 10°, such as up to 5° from perpendicular.

Preferably, the first angle position and the second angle position are perpendicular ±up to 4°, such as ±up to 2°.

The winglet may conveniently be in the acceleration mode when the support shaft is in the first angle position. The winglet may conveniently be in the deceleration mode when the support shaft is in the second angle position. Then the winglet may conveniently be in the intermediate mode when the support shaft is in the intermediate angle range between the first angle position and the second angle position.

The operation modes may thereby be regulated by rotation of the support shaft. This regulation may advantageously be a mechanical regulation, such as a regulation in dependence of the location of the effector relative to the respective end stops. In an embodiment, the regulation is a mechanical regulation providing that the winglet is closer to or in the deceleration mode when located closer to one of the end stop and closer to or in the acceleration mode when located further from both end stops. In an embodiment, the regulation is a mechanical regulation providing that the winglet is approaching or is in the deceleration mode when located closer to and approaching one of the end stop and approaching or is in the acceleration mode when located further from and retreating from the end stop Advantageously, the winglet in the acceleration mode is protruding outwards from the support shaft, wherein a root section of the winglet immediately adjacent to the root is protruding outwards in a protruding direction, which is perpendicular to the straight track section or has an angle of up to 30° from perpendicular, such as up to 20°, such as up to 10°, such as up to 5° from perpendicular to the straight track section.

Advantageously, the winglet in the deceleration mode is protruding outwards from the support shaft, wherein a root section of the winglet immediately adjacent to the root is protruding outwards in a protruding direction which angle up to 30° relative to the straight track section, such as up to 20°, such as up to 10°, such as up to 5° relative to the straight track section.

The winglet may advantageously be in the intermediate mode between the acceleration mode and the deceleration mode. The rotation of the support shaft may advantageously be performed with a relatively constant acceleration (i.e. linear increasing/decreasing speed).

Advantageously, the winglet in the intermediate mode is protruding outwards from the support shaft, wherein a root section of the winglet immediately adjacent to the root is protruding outwards in a protruding direction, which is from more than 5° to less than 85° from perpendicular to the straight track section, such as from more than 10° to less than 80° to less than 20° to less than 70° from more than 30° to less than 60° from perpendicular to the straight track section. The root section may e.g. be a length section determined from the root and up to 10 cm, such as up to 5 cm, such al up to 2 cm along the length of the winglet.

In an embodiment, the root section of the winglet comprises a length section of the winglet which is at least 1/100 of the length of the winglet, such as at least 1/10 the length of the winglet.

In an embodiment, the protruding direction is determined when the winglet is in unloaded condition.

In an embodiment, the winglet has a protruding plan, which is parallel to the support shaft axis. Preferably, the support shaft axis is in the protruding plan. Thereby the winglet and the support shaft to which it is rooted are symmetrical in the protruding plan. The protruding is determined when the winglet is in in unloaded condition e.g. determined as the middle plan between the two opposite collector faces of the winglet.

In an embodiment, wherein the support shaft axis is perpendicular to or has an angle of larger than 60° relative to the straight track section, such as at least 70°, such as at least 80°, at least 85°, at least 88°, relative to the straight track section. To ensure a highly balanced system, it is desired that the support shaft axis is perpendicular to the straight track section ±up to 6°, such as ±up to 2°.

Due to the compliant portion of the winglet, the winglet may have relatively large opposite surfaces for collecting the water waves. The compliant portion provides that the winglet may have several operation modes as described above even where the winglet is relatively large. Due to the compliant portion of the winglet, the winglet is capable of withstanding the torsional forces applied by turning the winglet from one operation mode to another operation mode. The compliant portion of the winglet bends when the winglet is forcibly twisted, as a consequence, the winglet is capable of withstanding the high rates of angular acceleration applied by turning the winglet from one operation mode to another operation mode.

The winglet may advantageously have a length of at least 0.5 m, such as from 1 to 5 m, such as from 1.5 to 3 m. the length of the winglet is determined as the maximal length of the winglet perpendicular to the support shaft.

The winglet may advantageously have a width of at least 0.1 m, such as from 0.3 m to 5 m, such as from 0.4 m to 3 m, such as from 0.5 to 2 m. The width is determined parallel to the support shaft and perpendicular to the length of the winglet.

Advantageously, the winglet is free of folding portions that may fold and unfold along lines, such as accordion folds. Such folding portions may reduce the robustness of the winglet.

In an embodiment, the winglet is plate shaped.

Example of shapes of the winglet includes semi elliptical shape, trapezoid shape, triangular shape, rectangular shape and combinations thereof.

The thickness of the winglet may advantageously be selected in dependence of the material of the winglet to ensure the desired compliance of the compliant portion. A thickness of up to 10 cm will usually be sufficient, such as up to 5 cm, such as up to 3 cm, such as up to 1 cm.

In an embodiment, where the winglet may have a larger thickness, e.g. up to 30 cm, such as op to 20 cm where it is rooted, such as mounted to the support shaft.

In an embodiment, the winglet has identical thickness in its entire extension.

In an embodiment, the thickness of the winglet is varying, such as varying along the length of the winglet. In an embodiment, the winglet is thinner further from its root relatively to closer to its root.

The winglet has a first and a second opposite side in the form of the two opposite winglet faces. In an embodiment, the winglet or each of a plurality of the winglets be arranged with a first support flap is located on the first side of the winglet. The first support flap is connected to the winglet at least at the root of the winglet. The connection may e.g. be via the support shaft. The first support flap protrudes from the root to a distance from the remote edge of the winglet. To support the winglet while still allowing the compliant portion of the winglet to bend to provide a desired angular displacement of at least one of the faces of the tip section of the winglet immediately adjacent to the remote edge of the winglet, the first support flap has a length, which is shorter than the length of the winglet.

Advantageously, the first support flap has a length (Lf) up to 75% of the length (Lw) of the winglet, such as from 10% to 60% of the length (Lw) of the winglet, such as from 20% to 50% of the length (Lw) of the winglet.

Advantageously, a second support flap is located on the second side of the winglet. The second support flap may conveniently be identical to the first support flap. Where it is anticipated that the wave acting on the first side and the second side respectively of the winglet may differ in force it may be desired to have different sizes (e.g. different lengths) of the first and the second support flap respectively.

The support flap has the function of supporting and protecting the winglet against damage as it will be explained further below.

Advantageously, the second support flap is connected to the winglet at least at the root of the winglet. The second support flap protrudes from the root to a distance from the remote edge of the winglet. Conveniently, the second support flap has a length, which is shorter than the length of the winglet. Preferably the second support flap has a length (Lf) up to 75% of the length (Lw) of the winglet, such as from 10% to 60% of the length (Lw) of the winglet, such as from 20% to 50% of the length Lw) of the winglet.

To provide a desired protection of the winglet, the first support flap and/or the second support flap has/have an equal or a higher stiffness than the winglet. Preferably, the first support flap and/or the second support flap is of a material having equal or higher stiffness than the material of the winglet. Advantageously, the first support flap and/or the second support flap has a thickness, which is equal or larger than a thickness of the winglet. In an embodiment, the first support flap and/or the second support flap may have an average thickness, which is equal or larger than an average thickness of the winglet.

In an embodiment, the first support flap is fixed to the first side of the winglet in a fixation length extending from the root and up to 50%, such as up to 25% of the length (Lf) of the first support flap, such as up to 10% of the length (Lf) of the first support flap. Thereby the first support flap may effectively support and protect the winglet when the winglet is turned from one operation mode to another, such as from acceleration mode to intermediate mode and/or further towards deceleration mode e.g. in a first direction along said straight track section, resulting in that the winglet is bending towards the first support flap and thereby is pressed towards the first support flap, whereas it has relatively low stiffening effect on the winglet when the winglet in another operation mode is bending away from the first support flap.

Advantageously, the fixation is extending in at least 50% of a width (Wf) of the first support flap, such as in the entire width (wf) of the first support flap for ensuring a desirable strong and durable fixation.

In an embodiment, the second support flap is fixed to the second side of the winglet in a fixation length extending from the root and up to 50%, such as up to 25% of the length (Lf) of the second support flap, such as up to 10% of the length (Lf) of the second support flap. Thereby the second support flap may effectively support and protect the winglet when winglet is turned from one operation mode to another, such as from acceleration mode to intermediate mode and/or further towards deceleration mode, e.g. in a second direction along said straight track section, resulting in that the winglet is bending towards the second support flap and thereby is pressed towards the second support flap, whereas it has relatively low stiffening effect on the winglet when the winglet in another operation mode is bending away from the second support flap.

Advantageously, the fixation is extending in at least 50% of a width (Wf) of the second support flap, such as in the entire width (wf) of the second support flap for ensuring a desirable strong and durable fixation.

For providing an effective harvesting of wave energy, it is desired that the effector comprises a plurality of winglets, such as at least 2, such as at least 4, such as at least 6, such as up to 20 winglets. The effector advantageously comprises an even number of winglets to ensure an effective, symmetrical and balanced operation of the effector Each of the winglet is advantageously rooted to one of the at least one support shaft. In an embodiment, two or more winglets are rooted to a common support shaft. In an embodiment, two or more winglets are rooted to separate support shafts of the backbone structure To ensure a highly effective, symmetrical and balanced operation of the effector, a plurality of the winglets of the effector are in the form of pair(s) of winglets, wherein each pair of winglets preferably is provided by two winglets rooted to a common support shaft of the at least one support shaft and protruding in opposite direction providing two oppositely protruding winglets.

Each pair of winglets may conveniently be rigidly interconnected at their respective winglet roots. By the term "rigidly interconnected" is meant that the interconnection at the root is rigid. Adjacent to the root the winglet may be compliant.

Preferably, the winglets of each pair of winglets is identical to each other and is rooted to the support shaft at a common longitudinal location of the support shaft.

In an embodiment, the effector comprises a plurality of pairs of winglets rooted to respective support shafts of the backbone structure.

In an embodiment, the effector comprises a plurality of pairs of winglets rooted to a common support shaft at respective longitudinal locations of the common support shaft.

The backbone structure of the effector may conveniently comprise a plurality of support shafts. The plurality of support shafts are advantageously perpendicular to the straight track section. Advantageously, the support shafts have parallel support shaft axes.

The wave power system may preferably be configured for controlling the operation modes of the winglet(s) in dependence of the location of the effector. This controlling may for example comprise that the winglet(s) when located within a distance $D_s$ from the respective stop locations, is in the deceleration mode. The distance $D_s$ from the respective stop locations is at least 0.1 m, such as at least 0.5 m, such as at least 1 m, such as at least 5 m.

In case of very violent weather, e.g. a storm or similar or in case of a warning of such very violent weather, the wave power system may be configured to maintain the winglet in deceleration mode and/or the wave power system may be configured to fully inactivate the winglet e.g. by folding or collapsing the backbone structure.

Advantageously, the controlling of the operation modes of the winglet(s) comprises that the winglet(s) in a center location and in a distance $D_c$ from the center location is in the acceleration mode. The distance $D_c$ from the center location is advantageously least 5% of the travelling length, such as at least 10% of the travelling length, such as at least 20% of the travelling length, such as at least 30% of the travelling length, such as at least 40% of the travelling length.

To ensure a high energy harvesting it is generally desired that the winglet is in the acceleration mode for a relatively long length, such as 2 times $D_c$, of the travelling length. At the same time, the wave power system should be configured for switching to reach the deceleration mode prior to reaching the respective end stops. Due to the density of the water and high velocity and/or acceleration of the water as the effector approaches an end stop, a too fast switching from the acceleration mode to the deceleration mode could result in overloading of the winglet and/or of the support shaft.

Thus by providing that the winglet in a length portion of the travelling length before reaching the end stop is in the intermediate mode, the switching becomes less onerous.

In addition, the compliant portion of the winglet ensures that the winglet is capable of withstanding the applied torsional forces.

Advantageously, the controlling of the operation modes of the winglet(s) comprises turning the winglet(s) from the acceleration mode to the intermediate mode when the effector is passing a first switch location towards a first of the stop locations. The first switch location may conveniently be located between the center location and the first stop location. Preferably, the controlling of the operation modes of the winglet(s) comprises providing that the intermediate mode is gradually approaching the deceleration mode in dependence of the effectors location as it passes from the first switch location and towards the first stop location.

In an embodiment, the controlling of the operation modes of the winglet(s) comprises turning the winglet(s) from the deceleration mode to the intermediate mode when the effector is passing the first switch location in its travelling away from a first of the stop locations and towards the center location. Preferably, the controlling of the operation modes of the winglet(s) comprises providing that the intermediate mode is gradually approaching the acceleration mode in dependence of the effectors location as it passes from the first switch location and towards the center location.

The wave power system advantageously comprises a mechanical arrangement for controlling the operation mode(s) in dependence of the location of the effector along the travelling length. The mechanical arrangement preferably comprises a kinematic clutch, such as a kinematic clutch between a first tethering located at the respective stop locations or a distance $D_s$ therefrom and a second tethering located at the effector.

In an embodiment, the effector is engaged with the basic structure via a wagon movable along the basic structure and carrying the effector. Advantageously, the backbone structure of the effector is fixed to the wagon. The wagon may comprises a mechanical arrangement for controlling the operation mode(s) in dependence of the location of the effector along the travelling length. The wagon may for example carry an activation element, which is mechanically activated by an element held in a fixed location relative to the straight track section e.g. a stop element.

The mechanical arrangement for controlling the operation modes in dependence of the location of the effector along the travelling length may advantageously be provided by a spring arrangement comprising a stick, slidable and via a spring mounted to the wagon and to the one or more support shafts, e.g. such that the spring tension is reduced when the when the winglets are in acceleration mode—i.e. the support shaft in in its first angle position. When the wagon reaches a first switch location towards one of the stop locations, the stick is engaged with an element, e.g. a stop flange at the stop location and is displaced backwards which results in a corresponding loading of the spring, while simultaneously a mechanical link between the stick and the support shaft ensures that the support shaft is turned from its first angle position and over an intermediate angle range corresponding to the displacement of the stick to finally reach its second angle position when the displacement of the stick is complete and the spring is in fully loaded stage.

The wagon is now at stand still and the winglets are in deceleration mode. At this stage the wagon with the effector may, if desired be locked to the basic structure e.g. if a storm is approaching or it is due for service.

If the wagon with the effector is not locked, the stick will push the wagon away from the stop location due to the loaded spring. Thereby the spring will be gradually unloaded and at same time the mechanical link between the stick and the support shaft provides that the support shaft is turned from its second angle position and over the intermediate angle range corresponding to the now forwards displacement of the stick to finally reach its first angle position when the forward displacement of the stick is complete and the spring is now in its most unloaded state. The winglets are now in fully acceleration mode.

The wave power system may be as described in co-pending DK application DK PA 2021 70164), with the difference that the effector(s) and the controlling thereof is as described herein.

In an embodiment, the wave power system is as the wave power device described in US2020088155 with the modification that effector and controlling thereof is as described herein, In an embodiment, the wave power system comprises a plurality of effectors adapted for travelling along the straight track section or along distinct straight track sections.

In an embodiment, the wave power system comprises a plurality of effectors adapted for travelling along respective travelling lengths between respective stop locations of the straight track section In a desired embodiment, the wave power system comprises a plurality of interconnected modules, wherein each module comprises a travelling length between two stop sections and at least one effector adapted to travelling along the travelling length.

By providing the wave power system with a plurality of interconnected modules, the wave power system may be designed to have a desired size. In addition, the wave power system may be enlarged or reduced even after installation.

Further, it makes it very simple to replace defective elements of the system.

To ensure a desired location of the wave power system relative to the water surface, the wave power system may advantageously comprise a plurality of buoyancy elements. The desired number and buoyancy effect of the buoyancy elements depends largely on the number and weight of the duct sections.

The buoyancy elements may be arranged for holding the basic structure at a desired buoyancy state relative to water surface for optimal harvesting of energy from the water waves.

Advantageously, the buoyancy elements are arranged for making the structure partly for fully buoyant.

Due to the almost neutral buoyancy of the basic structure, it will be relatively easy to couple to the effectors that have a slight buoyancy and thus keeps the whole system near the water surface, preferably such that the effectors are at least 80% by area submerged determined at still water, such as at least 90% by area submerged, such as at least 95% by area submerged, such as fully submerged determined at still water.

In principle, the effectors may be arranged for being moved in any directions by the water.

Water wave's displacement and frequency are often inconsistent and unpredictable. Generally, a water particle in a rolling wave travels in a circular or elliptical pattern, which comprises a vertical component and a horizontal component.

The effector may be adapted for being moved by a horizontal component of the water waves and/or by a vertical component of the water waves (rise and fall of the water).

Advantageously, effectors are movably engaged with the basic structure by being connected to the basic structure via transmission arrangement(s), for example each effector may be connected to the basic structure via one or more, such as one or two transmission arrangements.

The transmission arrangements may for example be as described in US2020088155.

In an embodiment, the transmission arrangement comprises at least one hydraulic ram directly or indirectly connected to the basic structure and directly or indirectly connected to the at least one effector, preferably the wave All features of the invention(s) and embodiments thereof including ranges and preferred ranges can be combined in various ways within the scope of the invention, unless there are specific reasons not to combine such features.

BRIEF DESCRIPTION OF THE EXAMPLES
AND DRAWING

The invention will be illustrated further below in connection with examples and embodiments and with reference to the figures. The figures are schematic and may not be drawn to scale. The examples and embodiments are merely given to illustrate the invention and should not be interpreted to limit the scope of the invention.

FIG. 10b is a front view of the winglet and support flaps of FIG. 10a.

Figure 1:
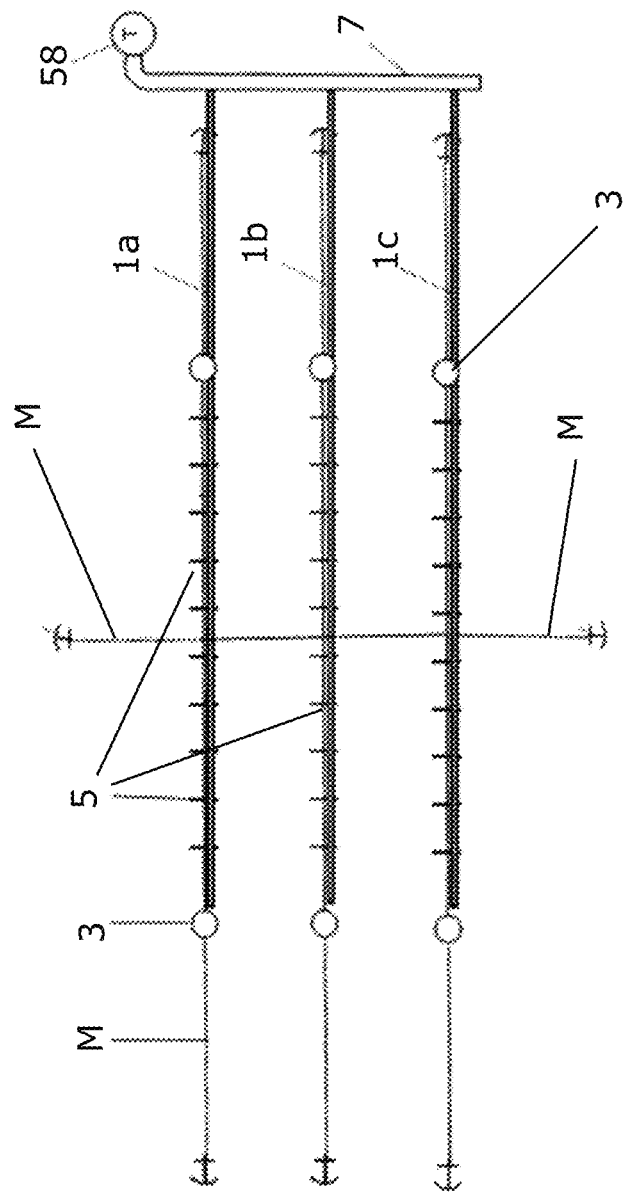
FIG. 1 is a schematic illustration of a wave power system according to an embodiment of the invention comprising a basic structure with a plurality of straight track sections each with a plurality of effectors.

FIG. 1 show a wave power system comprising a main structure comprising three straight track sections 1a, 1b, 1c connected to a common manifold 7 for transferring the pumped water to a turbine generator 8.

Each straight track sections 1a, 1b, 1c comprises a number of effectors 5, movably engaged with the respective straight track sections 1a, 1b, 1c and adapted for being moved by water waves along respective straight track sections 1a, 1b, 1c in respective travelling length between not shown stop locations. The stop locations are arranged for ensuring that the respective straight track sections are not colliding. The stop location may e.g. comprises a stop block or plate and/or a hydraulic ram as described below. The straight track sections 1a, 1b, 1c are moored by mooring lines M. Straight track sections 1a, 1b, 1c further comprises a number of buoyancy elements 3, where only a representative number of these are shown.

Figure 2:
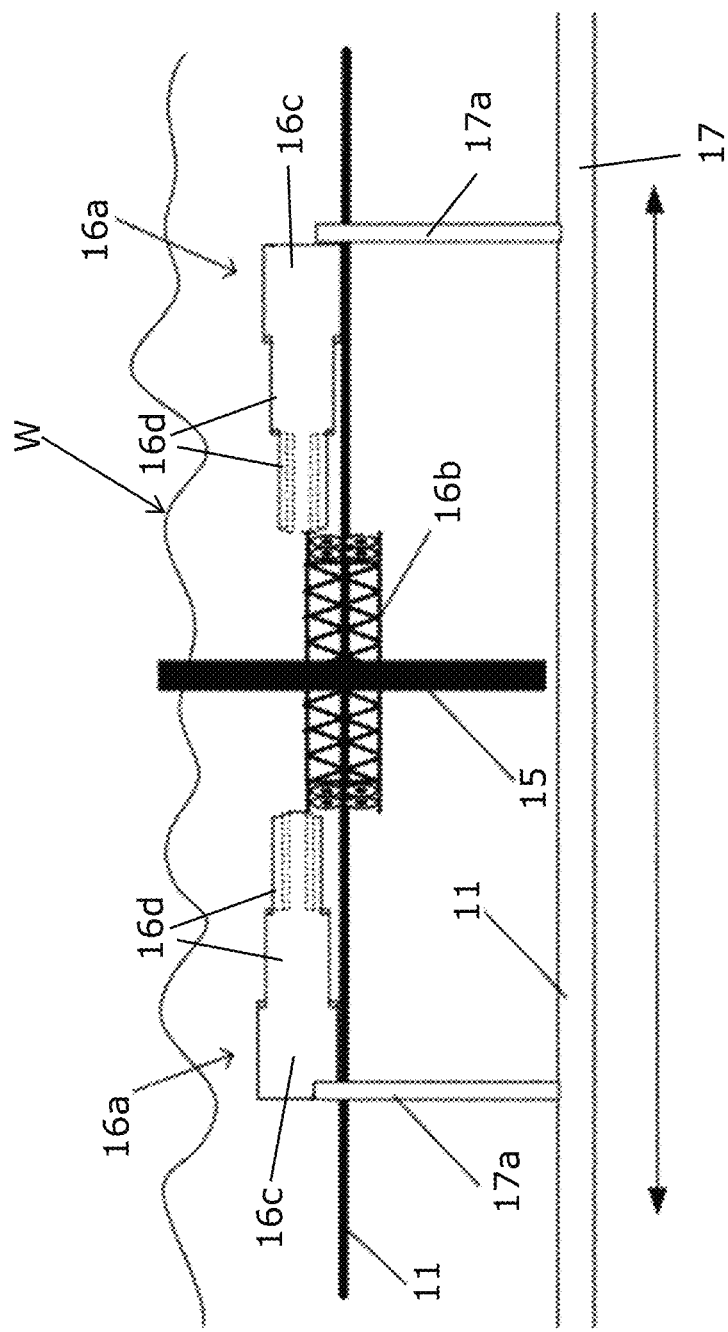
FIG. 2 is a schematic illustration of a portion of a wave power system according to an embodiment of the invention.

FIG. 2 illustrates a portion of a wave power system. The portion of the wave power system shown illustrated a module comprising a single effector 15. The wave power system comprises a basic structure comprising a straight track section 11 and the shown module comprises the effector 15 movably engaged with the straight track section 11. A transmission arrangement comprising a wagon 16b and two hydraulic rams 16a, is arranged to control the travelling of the effector along the straight track section 11. The effector 15 is mounted to the wagon 16b to slide along the straight track section 11 and the wagon and may for example be equipped with wheels for ensuring low frictional resistance between the wagon and the straight track section 11. Each end of the wagon 16b is mounted to a respective of the two hydraulic rams 16a.

The hydraulic rams 16a are adapted for pumping water into respective pipe sections 17a and further in to a pipeline 17 for transferring the pumped water to a turbine generator.

Each of the hydraulic rams 16a comprises a number of hydraulic sections comprising a main hydraulic section 16c, which are mounted to the pipe section 17a, and a number of displaceable hydraulic sections 16d, which are displaceable into the main hydraulic sections 16c for pumping water into the pipeline 17 via the pipe sections 17a. The wagon 16b is fixed to an outermost of the hydraulic sections 16d of each of the hydraulic rams 16a to thereby stabilize the movements of the effector 15 as it moves forth and back. The stabilizer 16b is moves together with the effector 15, and transfer the pumping effect to the hydraulic rams 16a, which thereby pumps water into the duct sections of the basic structure 11. The waterline is illustrated with "W".

The effector 15 comprises a backbone structure comprising at least one support shaft having a support shaft axis, and a number of winglets as described above. The winglets are seen in a side view and it can be seen that the winglets are in acceleration mode.

A first end stop location is defined by the location of the effector 15 when the wagon 16b has been moved along the straight track section 11 to fully compress a first of the hydraulic rams 16a, i.e. when the displaceable hydraulic sections 16d have been displaceable into the main hydraulic sections 16c.

A second end stop location is defined by the location of the effector 15 when the wagon 16b has been moved along the straight track section 11 to fully compress a second of the hydraulic rams 16a, i.e. when the displaceable hydraulic sections 16d have been displaceable into the main hydraulic sections 16c.

The traveling length is defined by the first and second stop locations.

Figure 3:
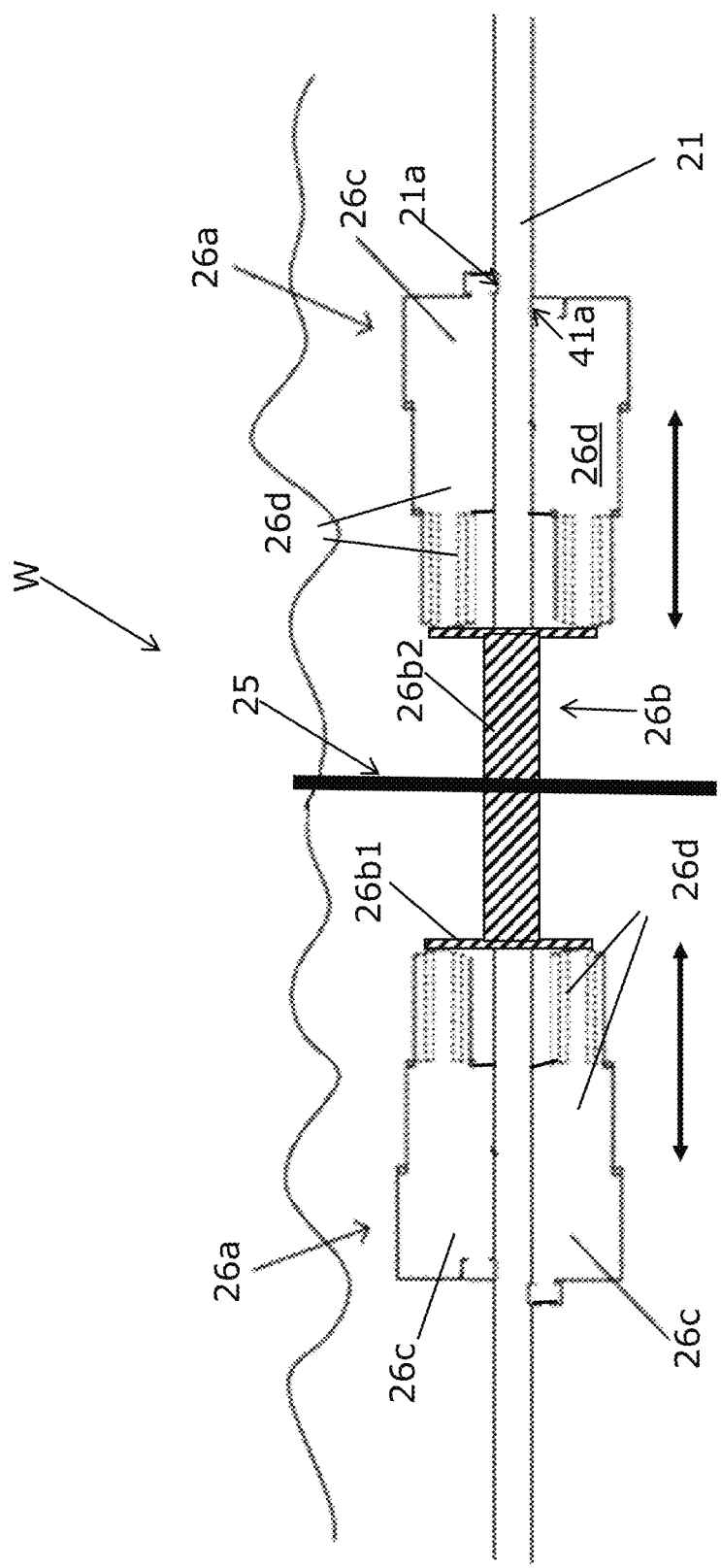
FIG. 3 is a schematic illustration of a portion of another wave power system according to an embodiment of the invention.

A not shown mechanical arrangement for controlling the operation modes in dependence of the location of the effector 15 along the travelling length may advantageously be provided e.g. as described above, FIG. 3 illustrates a section of a wave power system comprising a straight track section 21. The straight track section 21 has a number of inlet openings 21a and a transmission arrangement comprising four hydraulic rams 26a and a wagon 26b is connected to the straight track section 21 for feeding water directly into the straight track section 21, which thereby also serves as a pipeline for transferring the pumped water to a turbine generator.

Each of the hydraulic rams 26a comprises a number of hydraulic sections comprising a main hydraulic section 26c, and a number of displaceable hydraulic sections 26d, which are displaceable into the main hydraulic sections 26c for pumping water into the straight track section 21. The wagon 26b is fixed to an outermost of the hydraulic sections 26d of each of the hydraulic rams 26a stabilize the movements of the effector 25 as it moves forth and back. The wagon 26b comprises a flange 26b1 for connection to the hydraulic rams 26a and a body portion 26b2, with a bearing between the straight track section body portion 26b2 which allows the wagon 26b to move together with the effector 25, and transfer the pumping effect to the hydraulic rams 26a, which thereby pumps water into the straight track section 21. The bearing may e.g. be a ball bearing or a roller bearing. The waterline is illustrated with "W".

A first end stop location is defined by the location of the effector 25 when the wagon 26b has been moved along the straight track section 21 to fully compress a first pair of the hydraulic rams 26a, i.e. when the displaceable hydraulic sections 26d have been displaceable into the main hydraulic sections 26c.

A second end stop location is defined by the location of the effector 25 when the wagon 26b has been moved along the straight track section 21 to fully compress a second pair of the hydraulic rams 26a, i.e. when the displaceable hydraulic sections 26d have been displaceable into the main hydraulic sections 26c.

The traveling length is defined by the first and second stop locations.

Figure 4:
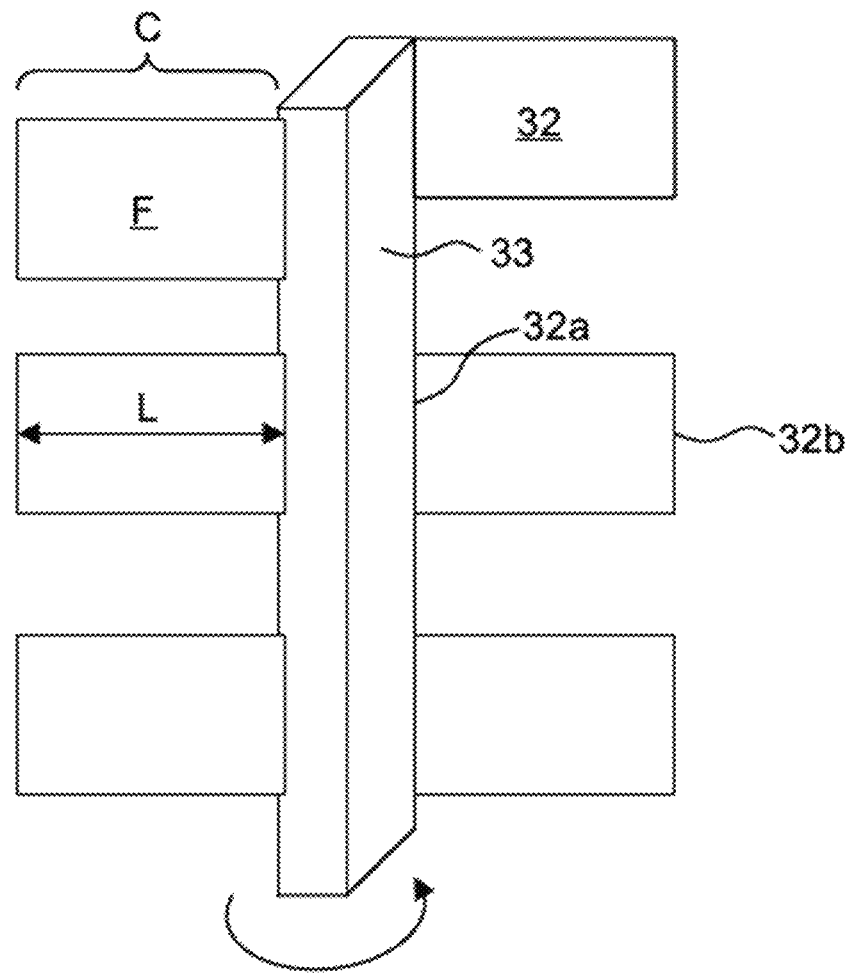
FIG. 4 is a schematic illustration of a perspective view of a support shaft of an effector with six rooted winglets.

A not shown mechanical arrangement for controlling the operation modes in dependence of the location of the effector 25 along the travelling length may advantageously be provided e.g. as described above, FIG. 4 show an embodiment of a support shaft 33 of an effector with six rooted winglets 32. Each winglet 32 has root 32a, a remote edge 32b farthest from the root 32a, a length L perpendicular to the support shaft and between the root and the remote edge and two opposite winglet faces F, Each of the six winglets has a compliant section C, which in this embodiment is the entire length of the respective winglets.

The 6 winglets 32 are rooted to and protrudes from the support shaft 33

As illustrated by the arrow, the support shaft 33 is rotatable. By rotating the support shaft 33, the winglets are turnable between operation modes as described above.

Due to the compliant portions of the winglets 32, the winglet becomes highly resistant towards damage for being turnable between operation modes.

Figure 5:
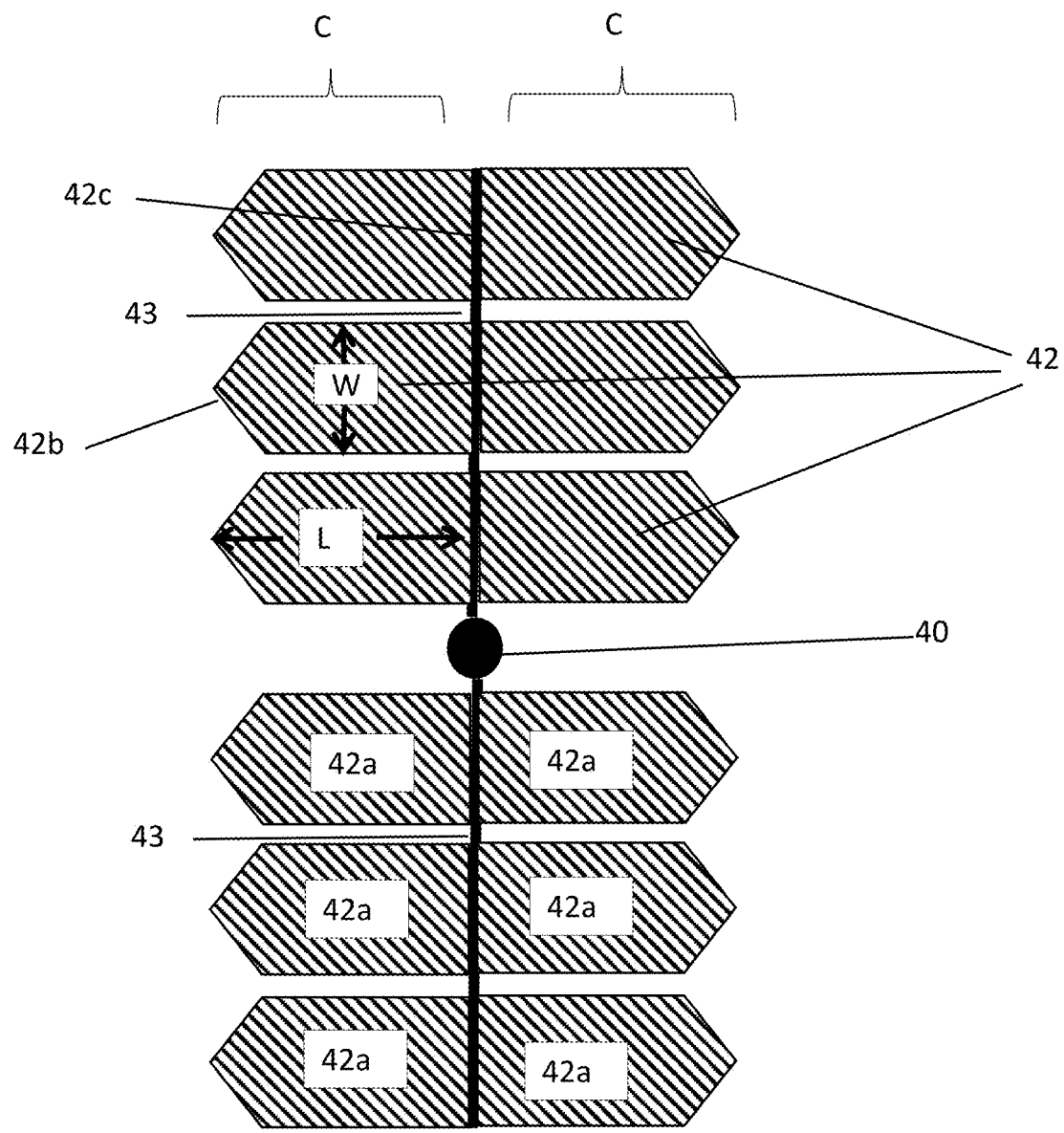
FIG. 5 is a schematic illustration of a top view of a pair of support shafts of an effector, each with three pairs of rooted winglets.

FIG. 5 shows a pair of support shafts 43 of an effector, each with three pairs 42 of rooted winglets. The pair of support shafts 43 are connected via a center shaft 40, wherein the center shaft 40 and the pair of support shafts 43 all form part of the backbone structure of the effector. The center shaft 40 may be fixed to a not shown wagon, which is engaged with the straight track section and adapted to being moved along the straight track section in the travelling length between stop locations.

The of support shafts 43 are rotatable relative to the center shaft 40. By rotating the support shaft 43, the pairs of winglets are turnable between operation modes as described above.

The respective pairs of winglets are rigidly interconnected at their respective winglet roots 42c. Each winglet of the winglets 42a has a remote edge 42b, a length L and a width W. Each of the winglets has a compliant section C.

Figure 6:
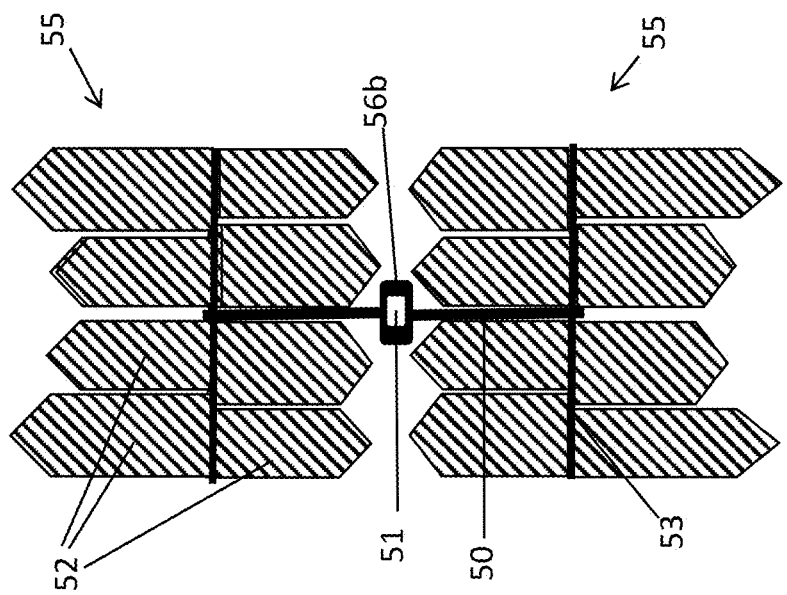
FIG. 6 shows another example of a pair of effectors fixed to a wagon.

FIG. 6 shows another example of a pair of effectors 55 fixed to a wagon 56 engaged with a straight track section 51. Each effector of the pair of effectors 55 has a backbone structure comprising a center shaft 50 and support shafts 53 carrying a number of winglets 52, which as shown in this embodiment hay differ in size. The winglets 52 are I acceleration mode.

FIGS. 7a-7d show examples of winglets with different shapes. The winglet 65a in FIG. 7a has triangular shape and a tip shaped edge 65a1. The winglet 65b in FIG. 7b has triangular shape and a tip shaped edge 65b1. The winglet 65c in FIG. 7c has triangular shape and a tip shaped edge 65c1. The winglet 65d in FIG. 7d has triangular shape and a tip shaped edge 65d1.

Figure 8B:
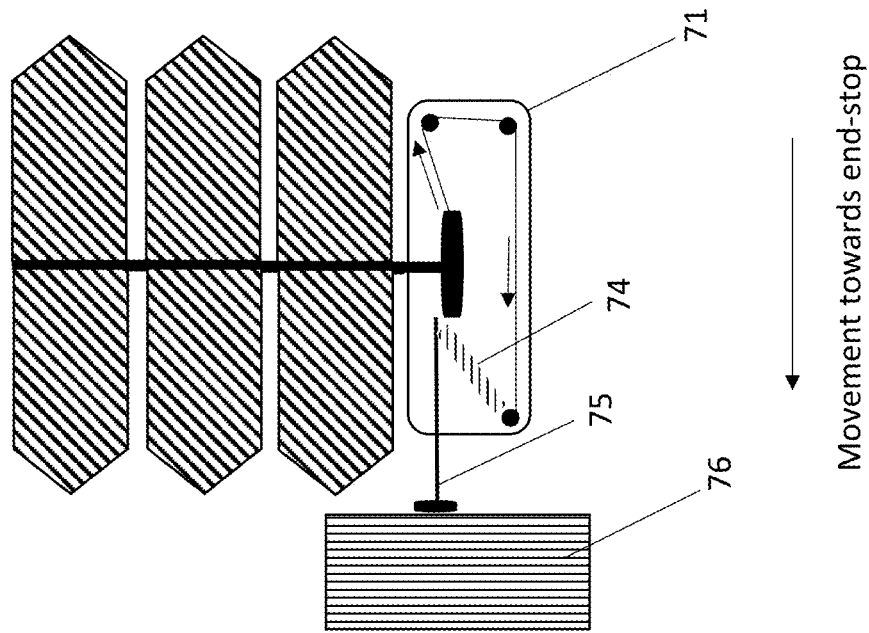
FIGS. 8a and 8b illustrates a wave power system of an embodiment of the invention comprising a wagon and a mechanical arrangement for controlling the operation modes in dependence of the location of the effector along the travelling length.
Figure 8A:
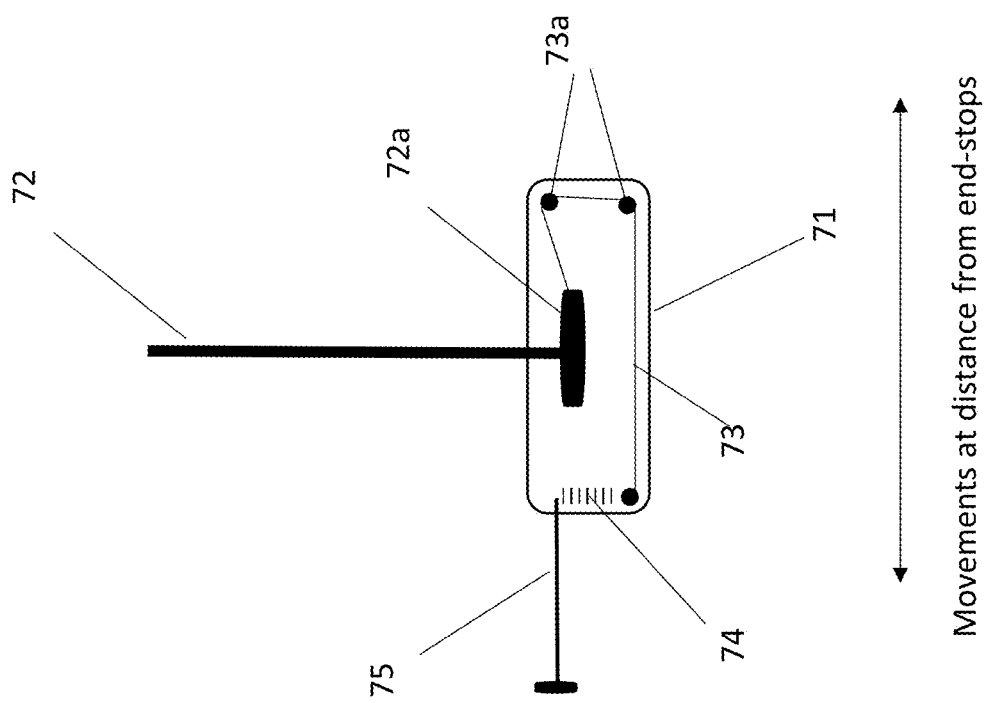

FIG. 8a show a wagon 71 whereupon a support shaft (72) is mounted via a mounting foot 72a. In FIG. 8a the wagon 71 is well away from end stops. When the wagon is away from end stops it is rotated into acceleration mode. The rotation of the support shaft 71 is controlled by a mechanism 73, which comprises a spring 74 and a mechanical end-stop gauge 75. The spring 74 is connected to the support shaft 72 via the mounting foot 72a via a tether cable 73, which passes over a number of pulleys 73a.

Figure 7A:
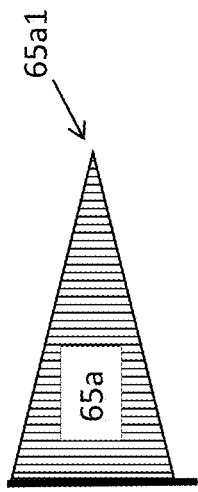
FIGS. 7a-7d show examples of winglets with different shapes.
Figure 7B:
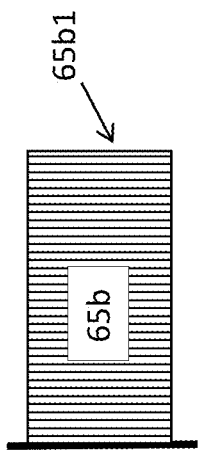
Figure 7C:
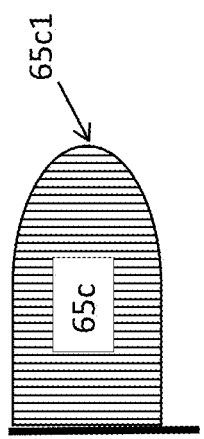
Figure 7D:
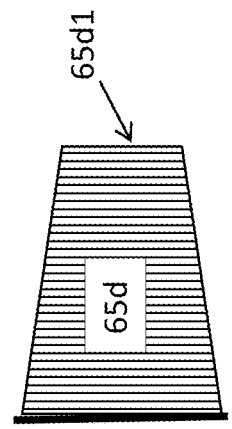

In FIG. 7b is shown the situation when the wagon is forced towards the end-stop 76 by wave action. Upon closing in on the end stop 76, the end-stop gauge 75 interacts mechanically with the end-stop 76, which provides a pulling in the tether cable 73, which rotates the shaft 72. At the same time, the spring 74 is energized, hereby storing energy, which will help pushing the wagon away from the end-stop and return the shaft 71 into acceleration mode when the wave direction reverses. The movements are indicated with the arrows.

Figure 9A:
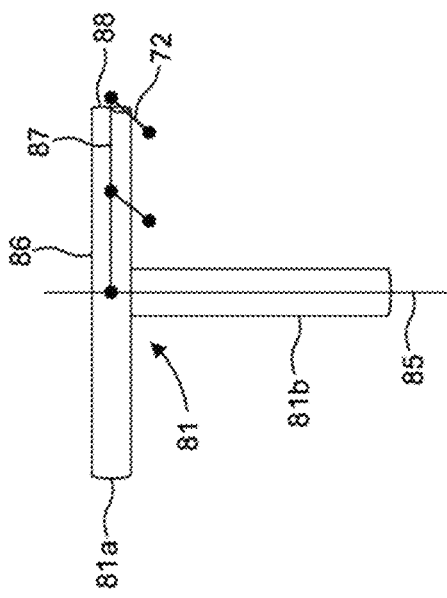
FIGS. 9a, 9b and 9c illustrates another wave power system of an embodiment of the invention comprising a wagon and a mechanical arrangement for controlling the operation modes in dependence of the location of the effector along the travelling length.
Figure 9C:
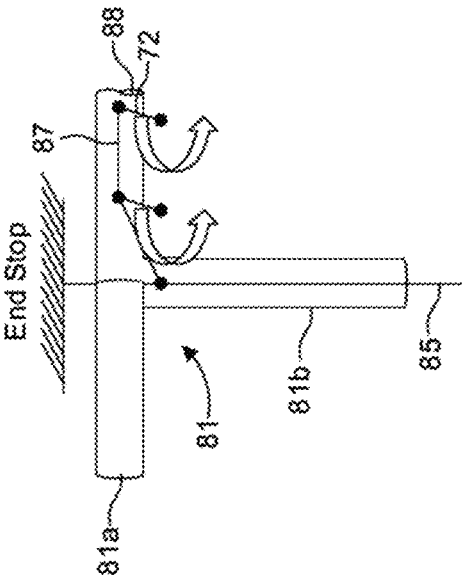
Figure 9B:
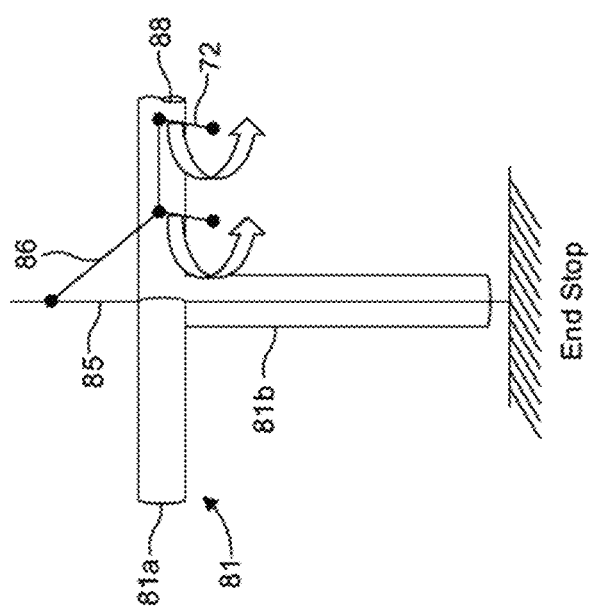

FIGS. 9a, 9b and 9c shows another implementation of a mechanical system that changes the mode close to end stops. The main structure is the wagon 81 which main structural elements are a transverse beam 81a and a support beam 81b. The transverse beam 81a is arranged perpendicular to the travel direction of the wagon 81 whereas the support beam 81b travels along the direction of the wagon 81.

The transverse beam 81a has a number of support shafts 72 mounted, each support shaft carrying one or more not shown winglets. Not all of the support shafts are shown. Advantageously support shafts are located on both sides of the transverse beam 81a. For clarity, only two of the right side support-shafts are drawn. For clarity, return springs as well as the winglets mounted on the support beams are also omitted from the sketch.

The wagon 81 is fitted with an end-stop piston rod 85, which runs through the wagon 81 and thus detects end stops in both directions. In FIG. 9a, the wagon 81 is located at a distance from both end stops. When the end-stop piston rod 85 hits an end-stop in either end of the wagon as illustrated in FIGS. 9b and 9c respectively, the master arm 86 of the backbone structure of the effector is displaced from perpendicular to the travelling direction, hereby shortening the projected length of the master arm 86. When the projection of the master arm 86 is shortened this pulls a pushrod 87 towards the end-stop piston rod 85, hereby forcing the arms 88 to rotate around the support beams 82. In this embodiment, the direction of rotation is the same no matter from what end the end-stop piston rod is actuated as indicated with the arrows.

Figure 10B:
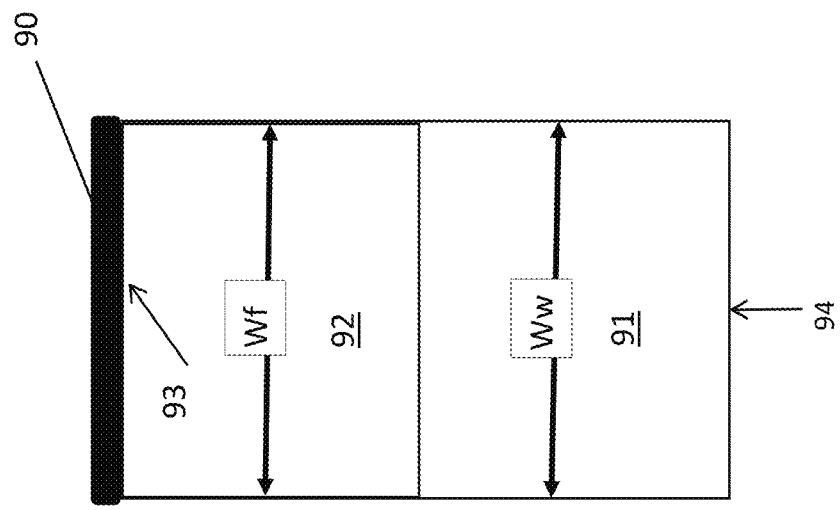
Figure 10A:
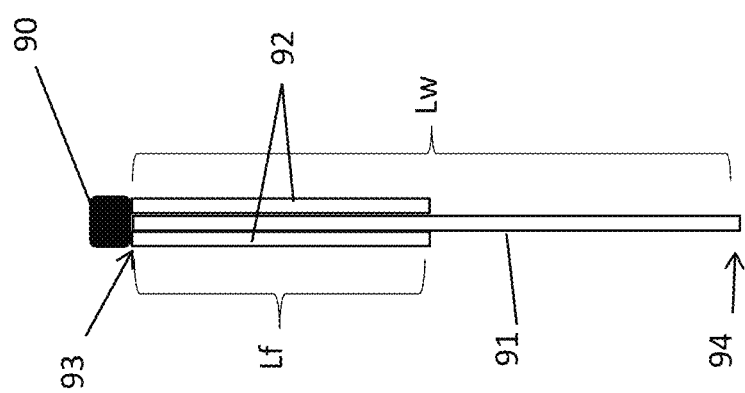
FIG. 10a is a side view of a winglet with a first support flap and a second support flap located at respectively the first and the second opposite sides of the winglet.

The winglet arrangement shown in FIGS. 10a and 10b comprises a winglet 91 rooted to and protruding from a support shaft 90. Respective first and second support flaps 92 are arranged at respective first and second opposite sides of the winglet, such that when the winglet is in unloaded condition as shown in FIGS. 10a and 10b the first and second support flaps 92 are in face-to-face contact with the respective first and second opposite sides of the winglet.

The first and second support flaps 92 are rooted to the support shaft 90 and thereby they are connected to the winglet 91 via the support shaft 90. The winglet 91 has a root 93 where it is rooted to the support shaft 90.

The winglet further has a remote edge 94 farthest from the root and a length Lw from the root 93 of the winglet to the remote edge 94 of the winglet.

The lengths Lf of the respective first and second support flaps 92 are equal in the shown embodiment. The skilled person would understand that the respective lengths Lf of the first and second support flaps 92 may in alternative embodiments differ from each other e.g. as described above. In the shown embodiment, the lengths Lf of the respective first and second support flaps 92 are about half the length of the length Lw of the winglet. As described elsewhere herein the respective lengths Lf of the first and second support flaps 92 may is alternative embodiments be longer or shorter relative to the length Lw of the winglet.

The winglet has a width Ww and the first and second support flaps 92 respectively has a width Wf. In the shown embodiment, the widths of the respective first and second support flaps 92 are equal to the width Ww of the winglet. As described elsewhere herein the respective width s Wf of the first and second support flaps 92 may is alternative embodiments be larger or smaller than relative to the width Ww of the winglet.

Figure 11B:
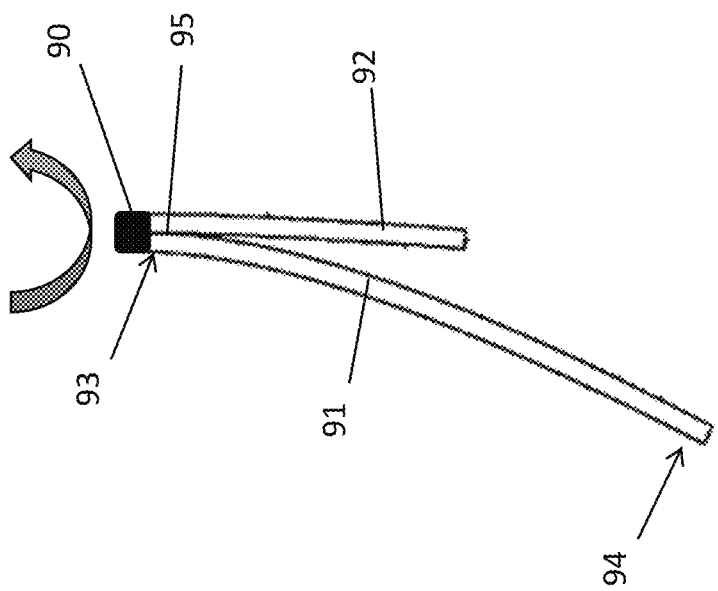
FIG. 11b illustrates the arrangement of FIG. 11a, wherein the winglet is turned from one operation mode to another operation mode providing that the winglet is bending away from the first support flap.
Figure 11A:
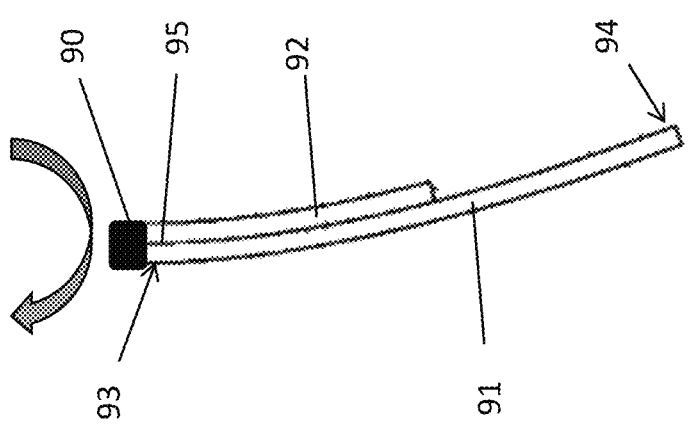
FIG. 11a illustrates an arrangement of a winglet with a first support flap located at the first side of the winglet and wherein the winglet is turned from one operation mode to another operation mode providing that the winglet is bending towards the first support flap.

The winglet arrangement shown in FIGS. 11a and 11b comprises a winglet 91 rooted to and protruding from a support shaft 90. A first support flap 92 are arranged at the first side of the winglet. It should be understood that the second support flap advantageously may be arranged at the second side of the winglet, however, for illustrative purposes only one support flange is shown.

The first support flap 92 is rooted to the support shaft 90 and in addition, it is also fixed to the winglet 91 at a fixation location 95 immediately adjacent to the root 93 of the winglet 91 where the winglet 91 is rooted to the support shaft 90

In FIG. 11a, the winglet is turned or is under turning from one operation mode to another as illustrated by the arrow, such as from acceleration mode to intermediate mode and/or further towards deceleration mode e.g. in a first direction along the not shown straight track section, thereby resulting in that the winglet is pressed towards the first support flap 92. It can be seen that the winglet is bending and the first surface of the winglet at the remote edge 94 of the winglet 91. The first support flap 92 act to reinforce the portion of the winglet closer to its root 93 while allowing the portion of the winglet closer to the remote edge 94 to deflect to a desired degree.

In FIG. 11b, the winglet is turned or is under turning from one operation mode to another as illustrated by the arrow, such as from acceleration mode to intermediate mode and/or further towards deceleration mode e.g. in a second direction opposite to the first direction along the straight track section, thereby resulting in that the winglet is pressed away from the first support flap 92. It can be seen that the winglet is bending substantially free of the first support flap 92.

By having first and second support flaps arranged at respective first and second opposite sides of the winglet as illustrated in FIG. 10a a desired high protection of the winglet may be provided while simultaneously ensuring a desired high flexibility of the winglet.

The invention claimed is:

1. A wave power system for extracting energy from water waves, the wave power system comprising:
    a basic structure comprising at least one straight track section;
    at least one effector movably engaged with said basic structure and configured for being moved by water waves along said straight track section in a travelling length between two stop locations; and
    an energy harvesting arrangement configured to harvest energy from relative movements between said at least one effector and said basic structure along said straight track section,
    wherein said at least one effector comprises:
        a backbone structure comprising at least one support shaft having a support shaft axis; and
        at least one winglet with a root, a remote edge farthest from the root, a length perpendicular to the support shaft and between the root and the remote edge, and two opposite winglet faces,
    wherein the winglet is rooted to and protrudes from said support shaft,
    wherein said winglet is turnable between operation modes comprising an acceleration mode, an intermediate mode, and a deceleration mode, relative to the support shaft axis, and
    wherein said winglet, at least in a compliant portion, is more compliant than the support shaft.

2. The wave power system of claim 1, wherein the compliant portion comprises a compliant length section which is at least 50% of the length on the winglet.

3. The wave power system of claim 1, wherein:
    the compliant portion of the winglet has a compliance providing that when the winglet is fully submerged in still standard seawater at 10° C. and is rotated 90° about the support shaft within a time interval of 0.5 sec, at least one of the faces of a tip section of the winglet immediately adjacent to the remote edge of the winglet will be angularly displaced with at least 10° relative to the at least one face in unloaded condition; and/or
    wherein the compliant portion of the winglet has a compliance providing that at least one of the faces of the tip section of the winglet immediately adjacent to the remote edge of the winglet is angularly displaceable with at least 10° relative to the at least one face in unloaded condition without resulting in irreversible plastic deformation; and/or
    wherein the compliant portion of the winglet has a compliance providing that when a force in the interval of from 25 N to 1 kN is applied to one of the faces of the tip section of the winglet, this at least one face of the tip section will be angularly displaced with at least 10° relative to the face in unloaded condition without resulting in irreversible plastic deformation.

4. The wave power system of claim 1, wherein at least the compliant portion of the winglet comprises a composite material comprising a polymer material with embedded fibers.

5. The wave power system of claim 1, wherein the winglet is rigidly rooted to the support shaft and the support shaft is turnable for turning the winglet, wherein said support shaft is turnable from a first angle position over an intermediate angle range to a second angle position, wherein the first angle position and the second angle position are perpendicular to each other or differ by an angle of up to 30° from perpendicular.

6. The wave power system of claim 5, wherein the winglet is in the acceleration mode when the support shaft is in the first angle position, wherein the winglet is in the deceleration mode when the support shaft is in the second angle position, and wherein the winglet is in the intermediate mode when the support shaft is in the intermediate angle range between the first angle position and the second angle position.

7. The wave power system of claim 1, wherein the winglet in the acceleration mode is protruding outwards from the support shaft, wherein a root section of the winglet immediately adjacent to the root is protruding outwards in a protruding direction, which is perpendicular to or has an angle of up to 30° from perpendicular to the straight track section.

8. The wave power system of claim 1, wherein said winglet in the deceleration mode is protruding outwards from the support shaft, wherein a root section of the winglet immediately adjacent to the root is protruding outwards in a protruding direction which angle up to 30° relative to the straight track section.

9. The wave power system of claim 1, wherein said winglet is in said intermediate mode between said acceleration mode and said deceleration mode, wherein a root section of the winglet immediately adjacent to the root is protruding outwards in a protruding direction, which is from more than 5° to less than 85° from perpendicular to the straight track section.

10. The wave power system of claim 1, wherein the support shaft axis is perpendicular to or has an angle of larger than 60° relative to the straight track section.

11. The wave power system of claim 1, wherein the effector comprises a plurality of winglets, wherein each winglet is rooted to one of said at least one support shaft, wherein a plurality of said winglets are in the form of pair(s) of winglets, wherein each pair of winglets is provided by two winglets rooted to a common support shaft of the at least one support shaft and protruding in opposite direction providing two oppositely protruding winglets.

12. The wave power system of claim 11, wherein each pair of winglets is rigidly interconnected at their respective winglet roots.

13. The wave power system of claim 1, wherein the at least one winglet has a first side and a second opposite side and wherein a first support flap is located on the first side of the winglet, said first support flap is connected to said winglet at least at the root of said winglet, said first support flap protrudes from said root to a distance from said remote edge of said winglet.

14. The wave power system of claim 13, wherein a second support flap is located on the second side of the winglet, said second support flap is connected to said winglet at least at the root of said winglet, said second support flap protrudes from said root to a distance from said remote edge of said winglet.

15. The wave power system of claim 13, wherein said first support flap has an equal or a higher stiffness than said winglet.

16. The wave power system of claim 1, wherein the wave power system comprises a mechanical arrangement for controlling the operation modes of said winglet(s) based on of the location of the effector.

17. The wave power system of claim 16, wherein the controlling of the operation modes of said winglet(s) comprises turning said winglet(s) from the acceleration mode to the intermediate mode when the effector is passing a first switch location towards a first of the stop locations, wherein said first switch location is located between a center location and said first stop location.

18. The wave power system of claim 16, wherein the controlling of the operation modes of said winglet(s) comprises turning said winglet(s) from the deceleration mode to the intermediate mode when the effector is passing said first switch location away from a first of the stop locations and towards the center location.

19. The wave power system of claim 1, wherein the effector is engaged with the basic structure via a wagon movable along the basic structure and carrying the effector.

* * * * *